United States Patent
Morino (10) Patent No.: US 9,421,838 B2
(45) Date of Patent: Aug. 23, 2016

(54) SUSPENSION ARM (71) Applicant: TOYOTA JIDOSHA KABUSHIKI KAISHA, Toyota-shi, Aichi-ken (JP)

(72) Inventor: Yasushi Morino, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/643,601

(22) Filed: Mar. 10, 2015

(65) Prior Publication Data

US 2015/0266350 A1 Sep. 24, 2015

(30) Foreign Application Priority Data

Mar. 20, 2014 (JP) ................. 2014-058989

(51) Int. Cl.
*B60G 7/00* (2006.01)
*B60G 3/06* (2006.01)

(52) U.S. Cl.
CPC ............... *B60G 7/001* (2013.01); *B60G 3/06* (2013.01); *B60G 2200/1424* (2013.01); *B60G 2204/148* (2013.01); *B60G 2204/416* (2013.01); *B60G 2206/122* (2013.01); *B60G 2206/162* (2013.01); *B60G 2206/722* (2013.01); *B60G 2206/8201* (2013.01); *B60G 2206/8207* (2013.01)

(58) Field of Classification Search
CPC .......... B60G 7/001; B60G 2206/8201; B60G 2206/162; B60G 2206/722; B60G 3/06
See application file for complete search history.

(56) References Cited

U.S. PATENT DOCUMENTS

| | | | | |
|---|---|---|---|---|
| 2005/0104315 A1* | 5/2005 | Howell | ................. | B60G 7/001 280/124.134 |
| 2011/0121533 A1* | 5/2011 | Lee | ........................ | B60G 3/202 280/124.128 |
| 2011/0298192 A1* | 12/2011 | Yu | .......................... | B60G 7/001 280/124.134 |
| 2013/0205591 A1* | 8/2013 | Santini | ................. | B29D 24/002 29/897.2 |

FOREIGN PATENT DOCUMENTS

| | | | | |
|---|---|---|---|---|
| JP | H06-143953 | A | 5/1994 | |
| JP | 2000-071731 | A | 3/2000 | |
| JP | 2002-219918 | A | 8/2002 | |
| JP | 2003019907 | A | * 1/2003 | ............... B60G 7/00 |
| JP | 2013-082341 | A | 5/2013 | |

* cited by examiner

*Primary Examiner* — Faye M Fleming
(74) *Attorney, Agent, or Firm* — Oliff PLC (57) ABSTRACT

A suspension arm includes an upper member and a lower member, and the side plates of the upper member are joined to the side plates of the lower member by welding. A weld line formed by a weld part is bent and terminated near a lower ball joint. A side plate includes a substantially-linear edge and a bent edge, which is bent from an end of the substantially-linear edge and within which the weld line is terminated. The weld line along the bent edge is inclined at a given angle or greater to a stress direction near a weld end.

3 Claims, 7 Drawing Sheets

SUSPENSION ARM

BACKGROUND OF THE INVENTION

1. Field of the Invention

The present invention relates to a suspension arm of a vehicle, and particularly to a welded structure in a suspension arm.

2. Description of the Related Art

As a suspension arm of a vehicle, there has been conventionally known a hollow suspension arm in which outer peripheral ends of an upper plate member and a lower plate member, which each have a U-shaped cross section, are joined together by welding (see Patent Document 1, for example).

[Patent Document 1] Japanese Patent Application Laid-open No. 6-143953

In recent years, weight saving of the whole vehicle has been strongly required in order to improve fuel efficiency, reduce exhaust gas, and improve motion performance. One solution for the weight saving of a suspension arm is to form the arm with thinner plate members, but reduction of the fatigue strength of the base material due to the thinning of the arm should be avoided. Since stresses often concentrate around a weld end near a lower ball joint attached to the suspension arm, the fatigue strength of the base material around the weld end needs to be particularly ensured.

SUMMARY OF THE INVENTION

The present invention has been made in view of such a situation, and a purpose thereof is to provide, in a suspension arm of which an upper member and a lower member, each having a substantially U-shaped cross section, are joined together by welding, a welded structure that improves fatigue strength of the base material around the weld ends.

To solve the problem above, a suspension arm according to an embodiment of the present invention relates to a hollow suspension arm that comprises: an upper member including an upper plate and a pair of side plates; and a lower member including a lower plate and a pair of side plates, and the side plates of the upper member are welded to the side plates of the lower member. The suspension arm receives an input from a road surface via a connecting component, and the weld line is bent and terminated near the connecting component. For example, the connecting component may be a lower ball joint, and the suspension arm may receive an input from a road surface to a wheel via the lower ball joint.

According to the embodiment, the weld line is bent and terminated near the connecting component, so that a stress caused in the base material around the weld end can be made in a bending direction. Since the base material has an allowable stress in a bending direction higher than that in a tensile (or compressive) direction, bending the weld line to cause a stress in a bending direction around the weld end can improve the fatigue strength of the base material around the weld end.

A side plate of the upper member or the lower member may include a substantially-linear edge and a bent edge, which is bent from an end of the substantially-linear edge, and the weld line may be terminated within the bent edge. By providing the bent edge on a side plate and performing welding along the bent edge, the weld line can be bent before being terminated.

The weld line along the bent edge may be inclined at a predetermined angle or greater to a stress direction near the weld end, which is the end of the weld line. For example, the weld line may be inclined at 45 degrees or greater to a stress direction near the weld end. Further, the weld line along the bent edge may be substantially perpendicular to a stress direction near the weld end, which is the end of the weld line. By increasing the angle between the weld line and a stress direction near the weld end, the bending direction component of a stress caused in the base material around the weld end can be increased, so that the fatigue strength of the base material can be improved.

The suspension arm according to the embodiment is supported by a vehicle body at a first connecting part and a second connecting part, and a direction in which a load is transmitted from the connecting component to the first connecting part and the second connecting part is defined as a load axis line, by means of a first virtual point corresponding to the connecting component, a second virtual point corresponding to the first connecting part, and a third virtual point corresponding to the second connecting part. The weld line may be bent in a direction away from the load axis line before being terminated. By bending the weld line with respect to the load axis line, the bending direction component of a stress caused in the base material around the weld end can be increased and, by increasing the distance between the weld end and the load axis line, a stress caused around the weld end can be made smaller.

The weld line on a side plate may be bent in a direction toward the lower plate or the upper plate. By positioning the weld end near the lower plate or the upper plate, a stress caused around the weld end can be made smaller.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4A shows a welded structure, FIG. 4B shows a side surface of an upper member.

DETAILED DESCRIPTION OF THE INVENTION

The invention will now be described by reference to the preferred embodiments. This does not intend to limit the scope of the present invention, but to exemplify the invention.

Figure 1:
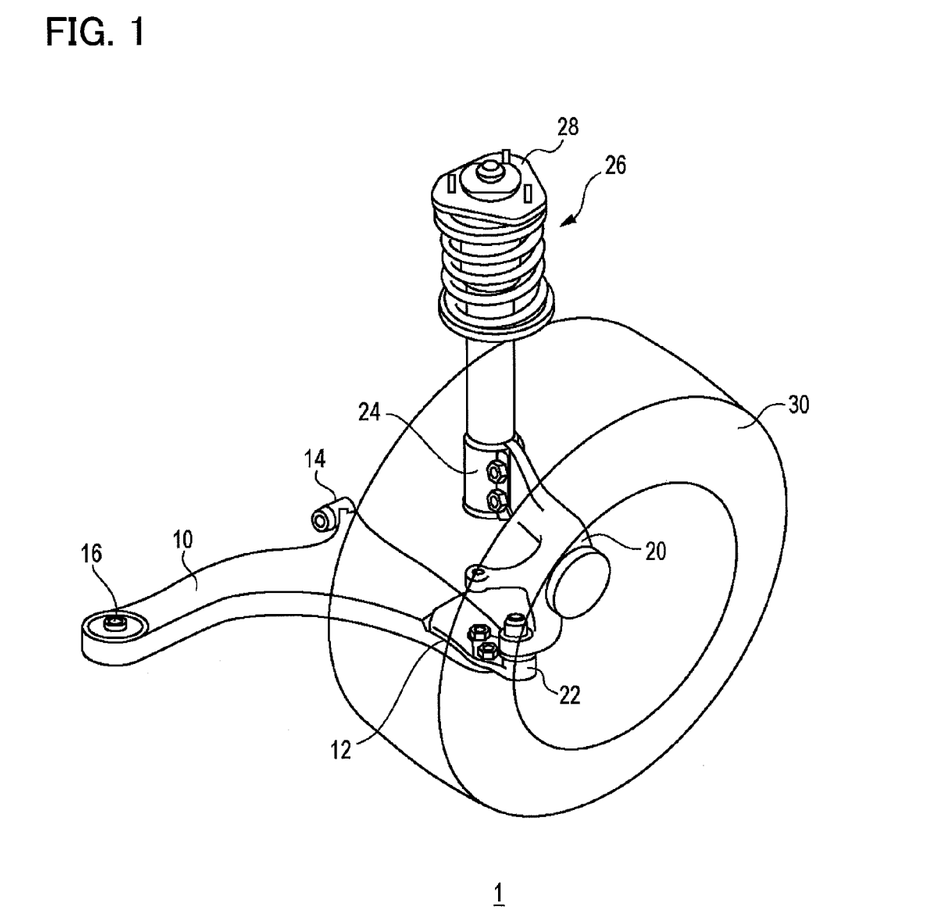
FIG. 1 is a diagram that shows a configuration of a strut-type suspension device.

FIG. 1 shows a configuration of a strut-type suspension device 1. A suspension arm 10 of the present embodiment is formed as an L-shaped arm in which overlapping parts of side plates of an upper member and a lower member, which each have a substantially U-shaped cross section, are welded to each other. The suspension arm 10 is pivotally supported on a vehicle body at a first connecting part 14 and a second connecting part 16, which each include a rubber bush, and a lower ball joint 22 is attached to the suspension arm 10 at an attachment part 12 via a bracket. The lower ball joint 22 is attached to a lower end of a knuckle 20, so that the attachment part 12 swingably supports the knuckle 20 via the lower ball joint 22. The knuckle 20 is a carrier for rotatably supporting a wheel 30, and an upper part of the knuckle 20 is fixed to a lower end of a strut 26 by a bracket 24. An upper end of the strut 26 is pivotally supported on the vehicle body via an upper support 28. The lower ball joint 22 as a connecting component is attached to the attachment part 12 of the suspension arm 10, so that the suspension arm 10 receives an input from a road surface via the lower ball joint 22.

Figure 2:
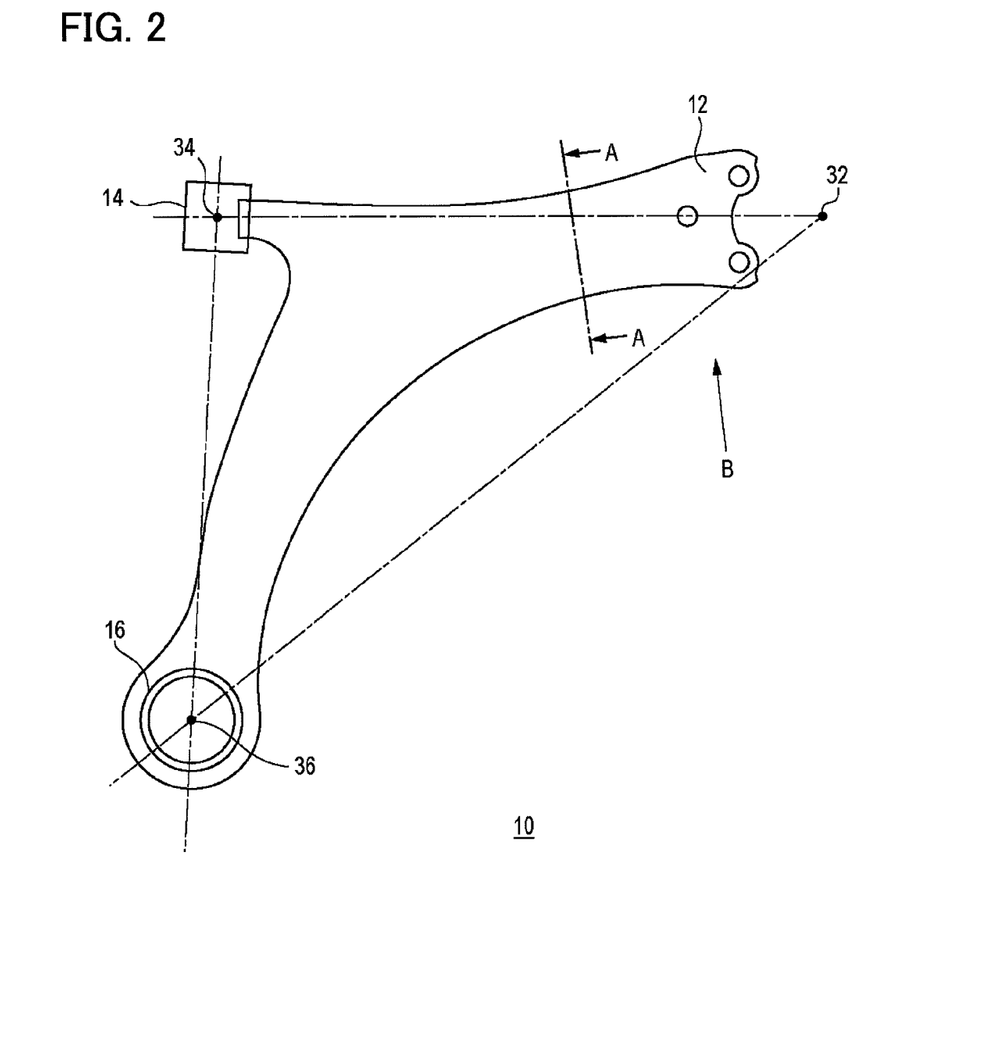
FIG. 2 is a diagram that shows an upper surface of a suspension arm according to the present embodiment.

FIG. 2 shows an upper surface of the suspension arm 10 according to the present embodiment. To the attachment part 12 is attached the lower ball joint 22 via a bracket, and a force received by the wheel 30 from a road surface is transmitted to the suspension arm 10 via the lower ball joint 22. The first connecting part 14 and the second connecting part 16 are supported by the vehicle body, and a load received by the attachment part 12 is transmitted to the first connecting part 14 and second connecting part 16.

In FIG. 2, a first virtual point 32 represents a virtual point corresponding to the lower ball joint 22, a second virtual point 34 represents a virtual point corresponding to the first connecting part 14, and a third virtual point 36 represents a virtual point corresponding to the second connecting part 16. More specifically, the first virtual point 32 corresponds to the center point of the lower ball joint 22, the second virtual point 34 corresponds to the center point of the first connecting part 14, and the third virtual point 36 corresponds to the center point of the second connecting part 16; a load transmitted within the suspension arm 10 acts to deform a virtual triangle having those three virtual points as vertices.

Figure 3:
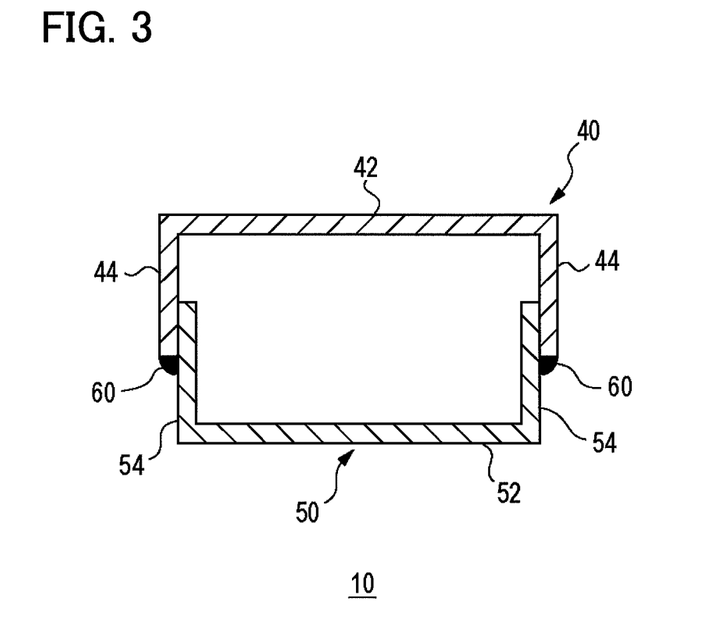
FIG. 3 is a diagram that shows a section of the suspension arm shown in FIG. 2 taken along line A-A.

FIG. 3 shows a section of the suspension arm 10 shown in FIG. 2 taken along line A-A. The suspension arm 10 is a hollow arm comprising an upper member 40 including an upper plate 42 and a pair of side plates 44, and a lower member 50 including a lower plate 52 and a pair of side plates 54. Namely, the suspension arm 10 has a so-called "hollow structure", in which the upper member 40 and the lower member 50 are joined together by welding. Each of the upper member 40 and the lower member 50 is formed by pressing a steel plate. A side plate 44 of the upper member 40 and a side plate 54 of the lower member 50 are welded to each other, and, in this example, an edge of the side plate 44 and a surface of the side plate 54 are joined together at a weld part 60. Alternatively, the side plates 54 of the lower member 50 may be located outside the side plates 44 of the upper member 40, and an edge of a side plate 54 and a surface of a side plate 44 may be joined together.

Figure 4A:
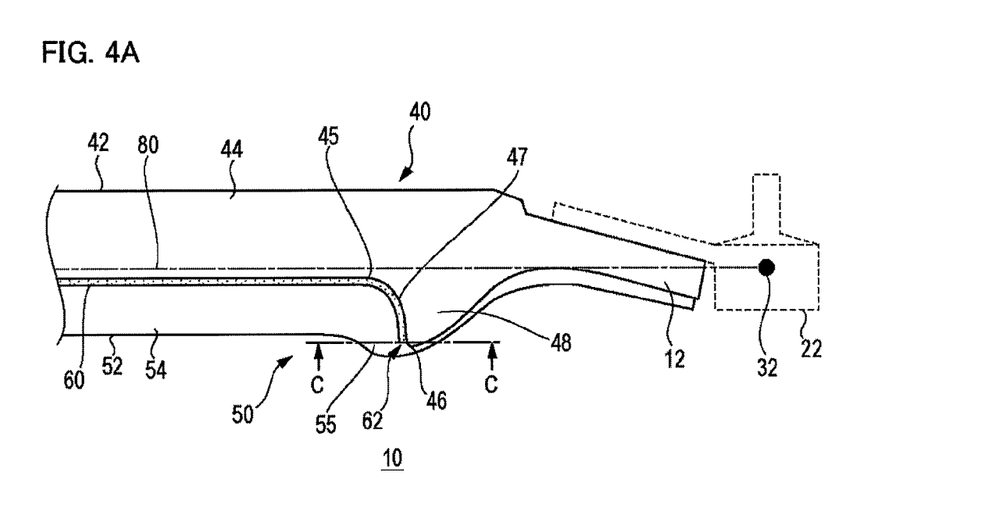

FIG. 4A shows a welded structure in the suspension arm 10 according to the present embodiment, illustrating a partial side surface near the attachment part 12 viewed from the direction of the arrow B in FIG. 2. A load axis line 80 in FIG. 4A shows a direction in which an input received from a road surface via the lower ball joint 22 is transmitted among the first virtual point 32, the second virtual point 34, and the third virtual point 36 in the suspension arm 10. The load axis line 80 is a line virtually defined so that, when the suspension arm 10 is viewed from the direction of the arrow B, a first axis line connecting the first virtual point 32 and second virtual point 34 overlaps with a second axis line connecting the first virtual point 32 and third virtual point 36; namely, the load axis line 80 is a line obtained by projecting a virtual triangle formed by the first virtual point 32, second virtual point 34, and third virtual point 36 onto the suspension arm 10 so that the first axis line and the second axis line overlap with each other.

An input received at the first virtual point 32, which is the center point of the lower ball joint 22, is transmitted along the load axis line 80 to the second virtual point 34 of the first connecting part 14 and the third virtual point 36 of the second connecting part 16. Similarly, an input received at the second virtual point 34 is transmitted along the load axis line 80 to the first virtual point 32 and third virtual point 36, and an input received at the third virtual point 36 is transmitted along the load axis line 80 to the first virtual point 32 and second virtual point 34. Thus, the load axis line 80 shows a direction of a load transmitted within the suspension arm 10.

When the suspension arm 10 is formed as an L-shaped arm that is substantially flat, the load axis line 80 is substantially in parallel with the upper plate 42 of the upper member 40 or the lower plate 52 of the lower member 50 when the suspension arm 10 is viewed from a side as shown in FIG. 4A.

Figure 4B:
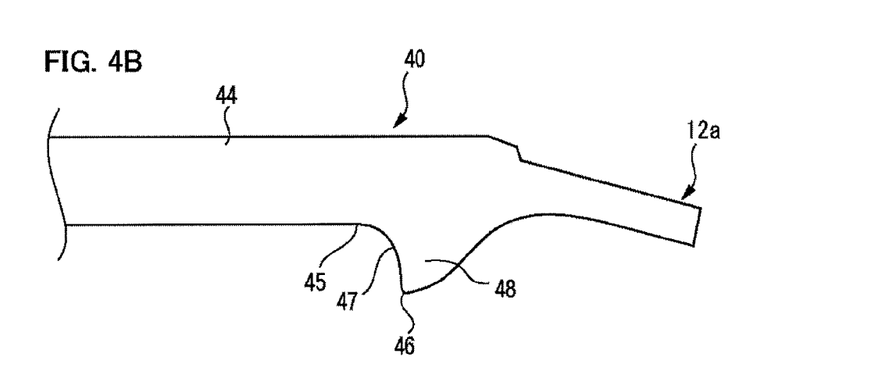

FIG. 4B shows a side surface of the upper member 40. The opposite side surface of the upper member 40 is also configured to have the same shape.

The upper member 40 in the present embodiment includes a protruding part 48 that protrudes downward near an attachment part 12a on a side plate 44. The side plate 44 has an edge that is substantially linear in the direction toward the attachment part 12a (the direction from left to right in FIG. 4B), and the edge is bent downward because of the protruding part 48. More specifically, by the presence of the protruding part 48, the edge of the side plate 44 is bent between a bend starting point 45, which is an end of the substantially-linear edge, and a bend ending point 46, in a direction away from the load axis line 80. Hereinafter, the edge between the bend starting point 45 and the bend ending point 46 will be referred to as a bent edge 47. Thereafter, the edge of the side plate 44 is bent upward in the direction from the bend ending point 46, which is the end of the bent edge 47, to the attachment part 12a.

Figure 4C:
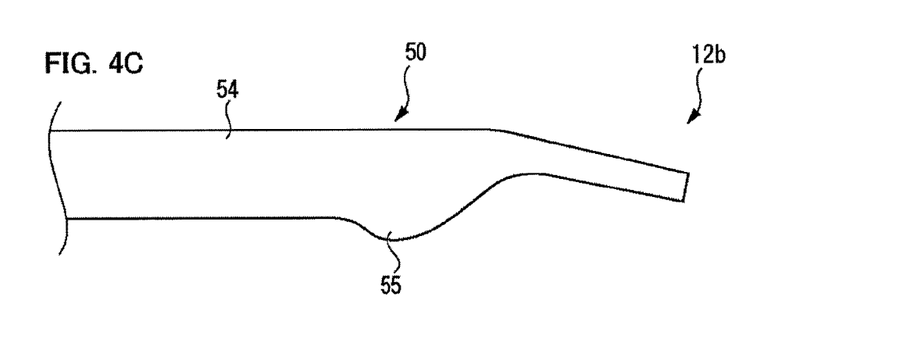
FIG. 4C shows a side surface of a lower member, in the suspension arm according to the present embodiment.

FIG. 4C shows a side surface of the lower member 50. The opposite side surface of the lower member 50 is also configured to have the same shape.

The lower member 50 in the present embodiment includes a protruding part 55 that protrudes downward near an attachment part 12b on a side plate 54. The protruding part 55 is formed according to the shape of the protruding part 48 of the upper member 40 and provided to ensure a welding margin for the bent edge 47 of the upper member 40. If the welding margin can be ensured, the protruding part 55 need not be provided.

Referring back to FIG. 4A, the side plate 44 of the upper member 40 is disposed outside the side plate 54 of the lower member 50 so as to overlap therewith. The side plate 44 of the upper member 40 and the side plate 54 of the lower member 50 are joined by welding at the overlapping part, and the weld part 60 is formed between the edge of the side plate 44 and the surface of the side plate 54. A weld line formed by the weld part 60 is bent and terminated near the lower ball joint 22.

Since the weld part 60 is formed along the edge of the side plate 44, the weld line is substantially linear at a position apart from the attachment part 12. Near the attachment part 12, on the other hand, since the bent edge 47 is formed from the bend starting point 45, the weld line is bent along the bent edge 47 from the bend starting point 45. The weld line is then terminated before the bend ending point 46 of the bent edge 47, so that a weld end 62 is positioned before the bend ending point 46.

Since the weld end 62 is positioned on the bent edge 47, the direction of a stress acting on the base material around the weld end 62 can be made different compared to the case where the weld end is positioned at the end of the substantially-linear weld line. Also, since the bent edge 47 is bent in a direction away from the load axis line 80, the weld end 62 is positioned apart from the load axis line 80.

Figure 5:
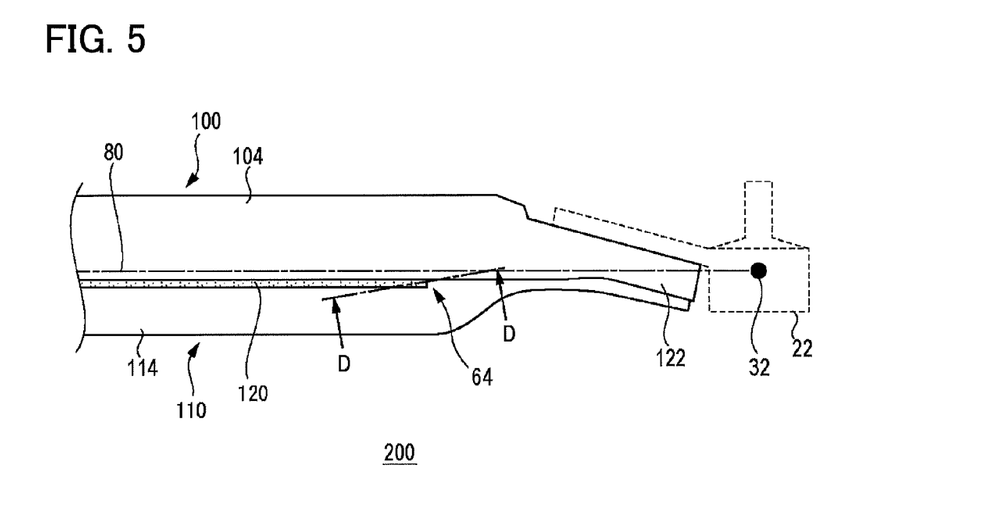
FIG. 5 is a diagram that shows a welded structure in a suspension arm provided as a comparative technique.

Before the functions provided by the above-mentioned welded structure of the present embodiment are discussed, another welded structure is presented in FIG. 5 for comparison with the welded structure of the present embodiment.

FIG. 5 shows a welded structure in a suspension arm 200 provided as a comparative technique. The suspension arm 200 comprises an upper member 100 and a lower member 110, which each have a substantially U-shaped cross section, and side plates 104 of the upper member 100 are joined to side plates 114 of the lower member 110 by welding. The lower ball joint 22 is attached to the suspension arm 200 at an attachment part 122. Compared to the suspension arm 10 of the present embodiment, the suspension arm 200 of the comparative technique is different in that the upper member 100 is not provided with the protruding part 48 on a side plate 104, the lower member 110 is not provided with the protruding part 55 on a side plate 114, and the weld line is substantially linear. Except for the above differences, the structure may be substantially identical with that in the present embodiment.

Unlike in the suspension arm 10 of the present embodiment, since the upper member 100 does not include the protruding part 48, the edge of the side plate 104 is formed to be substantially linear in a longitudinal direction, so that a weld line formed by a weld part 120 is also substantially linear, and a weld end 64 is positioned at the end of the substantially-linear weld line. The welded structure as described in the comparative technique is commonly seen in a conventional suspension arm.

Since an input from a road surface is transmitted to the suspension arm via the lower ball joint 22, the vicinity of a weld end positioned near the lower ball joint 22 is likely to become a stress concentration point. Accordingly, in a suspension arm, the vicinity of a weld end near the lower ball joint 22 is likely to become one of the weakest parts in terms of the fatigue strength of the base material. One solution for ensuring the fatigue strength near a weld end is to thicken the plate, but the solution is not preferable because it does not meet the need of weight saving of suspension arms. Meanwhile, the welded structure in the suspension arm 10 of the present embodiment has a structure by which the fatigue strength of the base material near the weld end 62 can be improved. In the following, the functions of the welded structure of the present embodiment will be described, compared to the welded structure in the suspension arm 200 of the comparative technique.

Figure 6A:
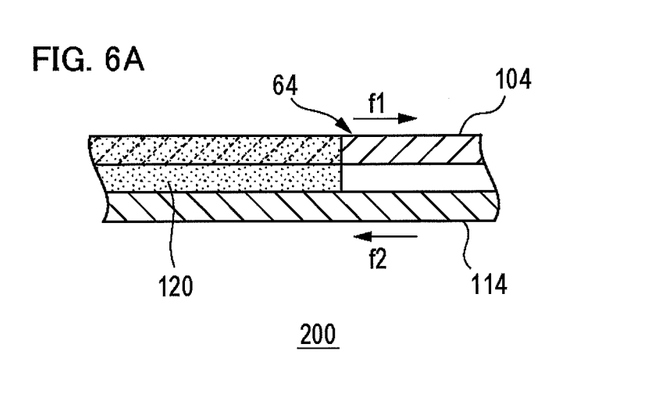
FIG. 6A is an illustrative diagram that shows a section near the weld end in the comparative technique taken along line D-D.

FIG. 6A is an illustrative diagram that shows a section near the weld end 64 in the comparative technique taken along line D-D. In FIG. 6A, a side plate 104 and a side plate 114 are shown to be spaced apart from each other in order to facilitate understanding, but the side plate 104 and side plate 114 are actually in contact with each other. It is assumed here that a force in a longitudinal direction of the vehicle is applied to the first virtual point 32 representing the center point of the lower ball joint 22.

When a load is input to the first virtual point 32, distortion occurs in the upper member 100 and the lower member 110 of the suspension arm 200. At the time, the amounts of distortion in the upper member 100 and lower member 110 are different depending on the difference in shape between the upper member 100 and lower member 110 that constitute the attachment part 122 to which the lower ball joint 22 is attached. Accordingly, forces in opposite directions act on the upper member 100 and the lower member 110 near the weld end 64. FIG. 6A shows the state where a tensile stress f1 acts on the side plate 104 of the upper member 100 and a compressive stress f2 acts on the side plate 114 of the lower member 110 near the weld end 64. The tensile stress f1 and the compressive stress f2 act in directions opposite to each other, and, conversely, a compressive stress may act on the side plate 104 and a tensile stress may act on the side plate 114.

In the suspension arm 200 of the comparative technique, a direction in which the weld part 120 extends near the weld end 64 is substantially identical with a direction in which a load acts (stress direction). Accordingly, the directions of stresses on the front surface and the back surface of the side plate 104 are the same, and a stress in the tensile direction or the compressive direction (hereinafter, referred to as a "tensile/compressive direction") occurs near the weld end 64. Since it is known that the base material has an allowable stress in a tensile/compressive direction lower than that in a bending direction, a load input near the weld end 64, where stresses often concentrate, is not preferably in a tensile/compressive direction. Therefore, in the suspension arm 200 of the comparative technique, the plate must be thickened in order to improve the strength of the base material near the weld end 64, which could be one of the weakest parts.

Figure 6B:
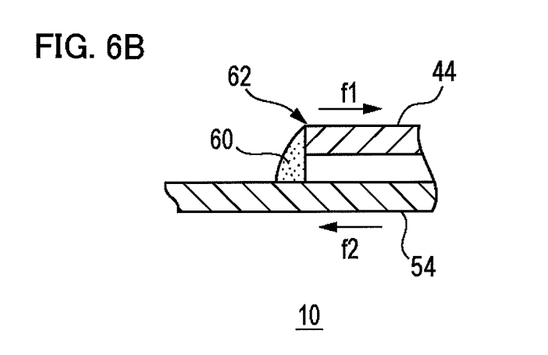
FIG. 6B is an illustrative diagram that shows a section near the weld end in the present embodiment taken along line C-C.

FIG. 6B is an illustrative diagram that shows a section near the weld end 62 in the present embodiment taken along line C-C. As with in FIG. 6A, a side plate 44 and a side plate 54 in FIG. 6B are shown to be spaced apart from each other in order to facilitate understanding, but the side plate 44 and side plate 54 are actually in contact with each other.

When a load in a longitudinal direction of the vehicle is input to the first virtual point 32, forces in opposite directions act on the upper member 40 and the lower member 50 of the suspension arm 10 near the weld end 62, because of the difference between the amounts of distortion caused in the upper member 40 and lower member 50. FIG. 6B shows the state where a tensile stress f1 acts on the side plate 44 of the upper member 40 and a compressive stress f2 acts on the side plate 54 of the lower member 50 near the weld end 62. The tensile stress f1 and the compressive stress f2 act in directions opposite to each other, and, conversely, a compressive stress may act on the side plate 44 and a tensile stress may act on the side plate 54.

In the suspension arm 10 of the present embodiment, the weld line along the bent edge 47 is substantially perpendicular to a stress direction near the weld end 62, which is the end of the weld line. Accordingly, the directions of stresses on the front surface and the back surface of the side plate 44 of the upper member 40 are opposite to each other near the weld end 62, and a stress in a bending direction occurs in the base material near the weld end 62. Since the base material has an allowable stress in a bending direction higher than that in a tensile/compressive direction, causing a stress in a bending direction near the weld end 62 can allow the thinning of the plate and improve the fatigue strength of the base material.

Figure 7A:
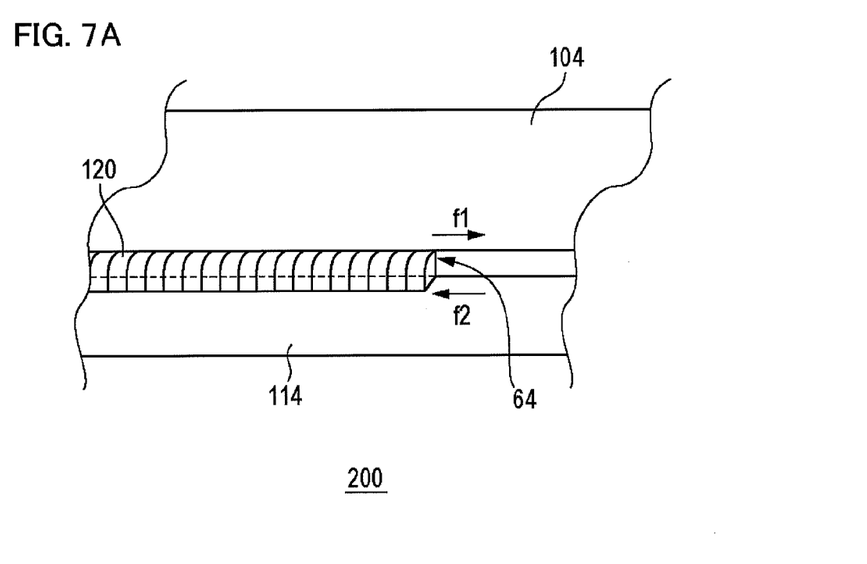
FIG. 7A is a partial perspective view of the welded structure in the suspension arm of the comparative technique.
Figure 7B:
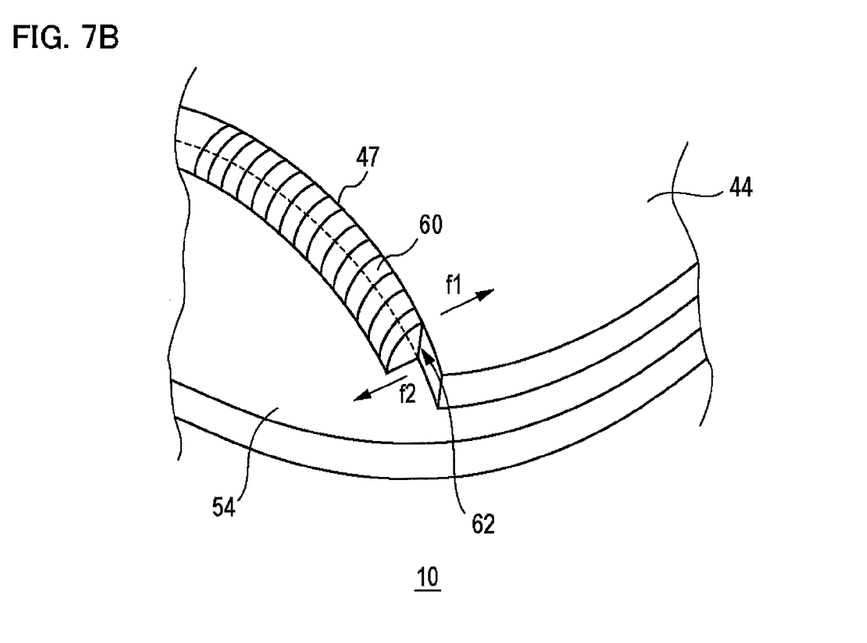
FIG. 7B is a partial perspective view of the welded structure in the suspension arm of the present embodiment.

FIG. 7A is a partial perspective view of the welded structure in the suspension arm 200 of the comparative technique, and FIG. 7B is a partial perspective view of the welded structure in the suspension arm 10 of the present embodiment. As is evident from the figures, in the suspension arm 200 of the comparative technique, the weld part 120 extends in the directions of the stresses f1 and f2, so that a stress in a tensile/compressive direction is caused in the base material around the weld end 64. In the suspension arm 10 of the present embodiment, on the other hand, the weld part 60 is formed along the bent edge 47, and the weld line is arranged substantially perpendicular to the directions of the stresses f1 and f2, so that a stress in a bending direction is caused in the base material around the weld end 62. Thus, in the suspension arm 10, the weld line is bent before being terminated, causing a stress in a bending direction in the base material around the weld end 62. By causing a stress in a bending direction, instead of in a tensile/compressive direction, around the weld end 62, the fatigue strength of the base material having a higher allowable stress in a bending direction can be improved, enabling the thinning of the base material.

In the bent edge 47 shown in FIG. 4A, the weld line is terminated at a position where the weld line is substantially perpendicular to a direction in which the side plate 44 extends; however, the weld line may be terminated at another position within the bent edge 47. For example, the weld line may be terminated at a position between the position represented as the weld end 62 and the bend starting point 45 in FIG. 4A. By bending the weld line with respect to the load axis line 80 before terminating the weld line, the tensile/compressive direction component of a stress caused near the weld end 62 can be decreased while the bending direction component of the stress can be increased, compared to the case where the weld line is terminated without being bent. Thus, by terminating the weld line within the bent edge 47, the fatigue strength of the base material around the weld end 62 can be improved. The weld line along the bent edge 47 is preferably inclined near the weld end 62 at a predetermined angle or greater to a stress direction, such as at 45 degrees or greater thereto. When the weld line near the weld end 62 is inclined at a predetermined angle or greater to a stress direction, the ratio of the bending direction component to the tensile/compressive direction component in the stress can be increased.

Also, by bending the weld line in a direction away from the load axis line 80 and positioning the weld end 62 within the bent edge 47, the distance between the weld end 62 and the load axis line 80 can be increased. When the distance from the load axis line 80 is longer, a stress to be caused becomes smaller; therefore, by arranging the weld end 62 apart from the load axis line 80, a stress caused near the weld end 62 can be made smaller. In this way, by bending the weld line in the direction toward the lower plate 52 to increase the distance between the weld end 62 and the load axis line 80, a stress caused near the weld end 62 can be made smaller, so that the fatigue strength of the base material near the weld end 62 can be further improved.

The present invention has been described with reference to the embodiment. The embodiment is intended to be illustrative only, and it will be obvious to those skilled in the art that various modifications to a combination of constituting elements or processes could be developed and that such modifications also fall within the scope of the present invention.

In the embodiment, a side plate 44 has a protruding part 48 that protrudes downward; instead, as a modification, the side plate 44 may have a notch that is notched upward. Also in this case, a stress in a bending direction can be caused around the weld end by bending the weld line and terminating it near the lower ball joint 22. Such a welded structure of the modification is especially effective in the case where the load axis line 80 is located below the weld line, but the application is not limited thereto.

Also, as described previously, the side plates 54 of the lower member 50 are overlapped by the side plates 44 of the upper member 40 from the outside and welded thereto in the embodiment; conversely, the side plates 44 of the upper member 40 may be overlapped by the side plates 54 of the lower member 50 from the outside and welded thereto. In this case, each of the side plates 54 may have a protruding part that protrudes upward so that the weld line is bent along the bent edge of the protruding part and terminated near the lower ball joint 22. Namely, the bent edge may be bent in a direction toward the upper plate 42 so that the weld line is terminated near the upper plate 42. Thus, the vertical positions of the upper member 40 and the lower member 50 are relative in the suspension arm 10, and the vertical positional relationship described in the embodiment may be reversed.

What is claimed is:

1. A suspension arm that receives an input from a road surface via a connecting component, the suspension arm having a hollow structure comprising: an upper member including an upper plate and a pair of side plates; and a lower member including a lower plate and a pair of side plates, the side plates of the upper member being welded to the side plates of the lower member, wherein:

the weld line is bent and terminated near the connecting component;

the suspension arm is supported by a vehicle body at a first connecting part and a second connecting part, and a direction in which a load is transmitted from the connecting component to the first connecting part and the second connecting part is defined as a load axis line, by means of a first virtual point corresponding to the connecting component, a second virtual point corresponding to the first connecting part, and a third virtual point corresponding to the second connecting part; and the weld line is bent in a direction away from the load axis line before being terminated.

2. The suspension arm of claim 1, wherein:

the side plate of the upper member or the lower member includes a substantially-linear edge and a bent edge, which is bent from an end of the substantially-linear edge;

the weld line is terminated within the bent edge; and the weld line along the bent edge is inclined at a predetermined angle or greater to a stress direction near the weld end, which is the end of the weld line.

3. The suspension arm of claim 1, wherein:

the side plate of the upper member or the lower member includes a substantially-linear edge and a bent edge, which is bent from an end of the substantially-linear edge;

the weld line is terminated within the bent edge; and the weld line along the bent edge is substantially perpendicular to a stress direction near the weld end, which is the end of the weld line.

* * * * *